Jan. 11, 1949. B. WOLDRING ET AL Re. 23,079

CONVEYER

Original Filed Nov. 22, 1943 2 Sheets-Sheet 1

Witness:
Geo. L. Chapel

Inventors
Bert Woldring
James R. Sebastian

By Thomas Rice
Attorney

Jan. 11, 1949. B. WOLDRING ET AL Re. 23,079

CONVEYER

Original Filed Nov. 22, 1943 2 Sheets-Sheet 2

Witness:
Geo. L. Chapel

Inventors
Bert Woldring
James R. Sebastian

By Wm. Lynus Rice

Attorney

Reissued Jan. 11, 1949

Re. 23,079

UNITED STATES PATENT OFFICE 23,079

CONVEYER

Bert Woldring and James R. Sebastian, Grand Rapids, Mich., assignors to Rapids-Standard Co., Inc., Grand Rapids, Mich., a corporation of Michigan Original No. 2,347,308, dated April 25, 1944, Serial No. 511,232, November 22, 1943. Application for reissue March 5, 1945, Serial No. 580,944

3 Claims. (Cl. 193—35)

The present invention relates to conveyers and more particularly to conveyers of the gravity type.

The primary objects of the instant invention are to provide a conveyer of the general character above indicated whose inclination may be adjustably varied; to provide such a conveyer which is simple in construction; to provide such a conveyer which is novel in its structural characteristics; and, to provide such a conveyer which is reasonably economical in manufacture.

An illustrative embodiment of the invention is shown in the accompanying drawings wherein.

Figure 1:
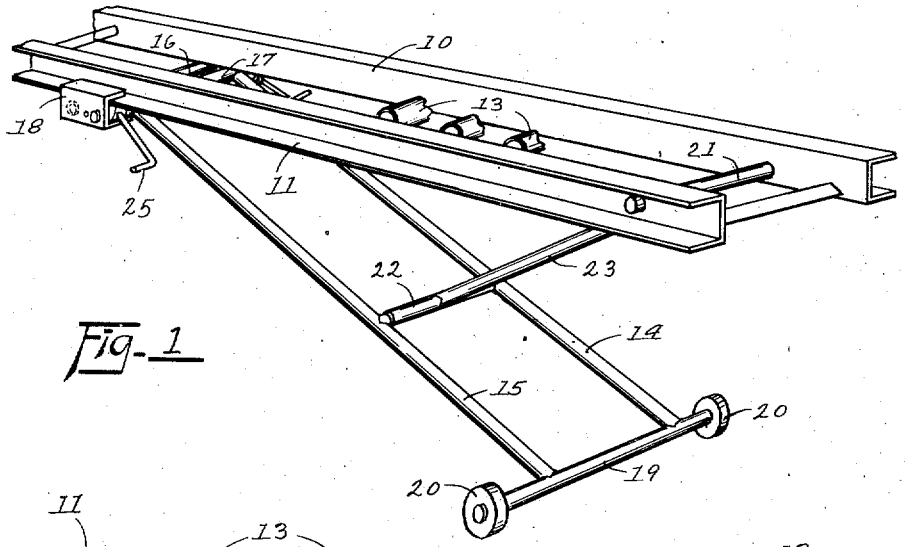
Figure 1 is a fragmentary perspective view of the conveyer and its retractible support or carriage.
Figure 2:
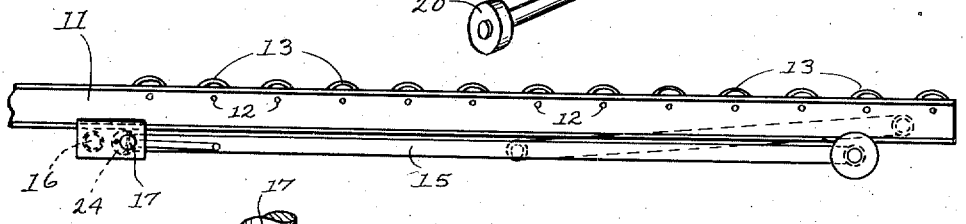
Figure 2 is a fragmentary front elevational view of the conveyer and its retractable support in its retracted position.
Figure 3:
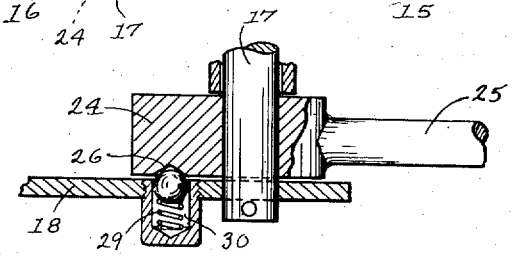
Figure 3 is an enlarged sectional view on line III—III of Figure 5.
Figure 4:
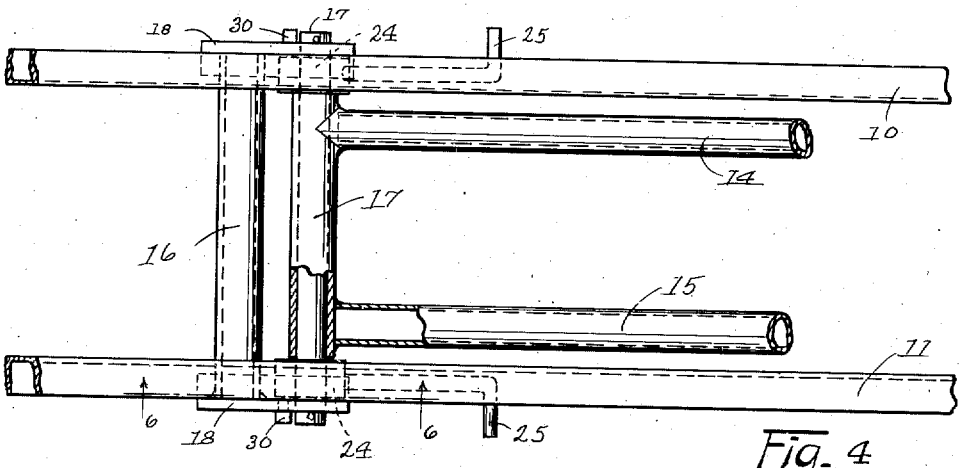
Figure 4 is an enlarged fragmentary top plan view of the conveyer and its retractable support.
Figure 5:
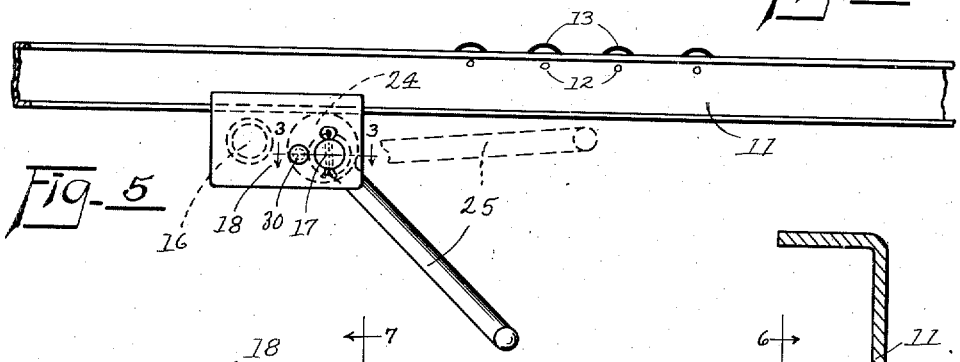
Figure 5 is an enlarged fragmentary side elevational view similar to Figure 2 but showing the retractable support in its conveyer supporting position.

Referring then to the drawings wherein like parts of the structure shown are designated by the same numerals in the several views, the conveyer shown comprises a pair of rails 10, 11, there shown as metal channel bars secured together in spaced relationship by means of a plurality of spaced shafts 12, each carrying a free running roller 13 for conveying the work from the receiving end of the conveyer or from its upper or left end as viewed in Figure 1 to its lower or right end as viewed in the same figure.

A retractable support whereby the inclination of the conveyer may be adjustably varied comprises a pair of spaced apart tubular members 14, 15, each secured at its inner or upper end to a transverse tubular member 17 disposed intermediately of the opposite ends of the spaced conveyer rails 10, 11, the opposite ends of the members 17 each being rotatably disposed within a channel bar housing 18, each respectively longitudinally slidable on the lower longitudinal portion of a rail 10, 11.

The outer or lower ends of each tubular member 14, 15 forming the retractable support for the conveyer are secured to a transversely disposed tubular member 19 whose respective ends are each provided with a roller 20 making for mobility of the conveyer.

The lower or receiving end of the conveyer is provided with a shaft 21 rotatably disposed between the rails 10, 11. A tubular member 22 is secured between the members 14, 15. A transverse member 23 is secured to the tubular member 22 and to the shaft 21 medially of the ends of both.

Figure 6:
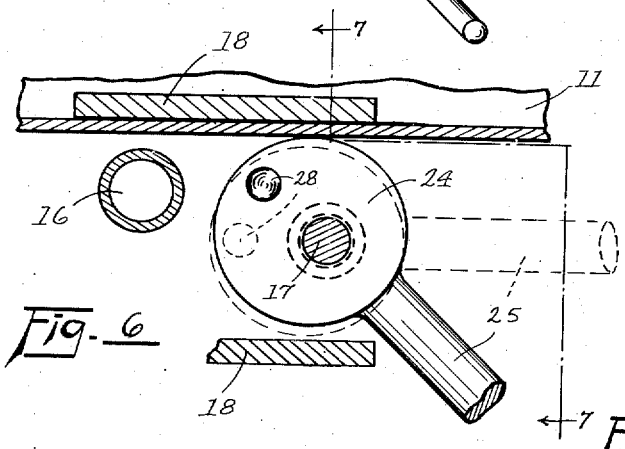
Figure 6 is an enlarged sectional view on lines VI—VI of Figures 4 and 7.
Figure 7:
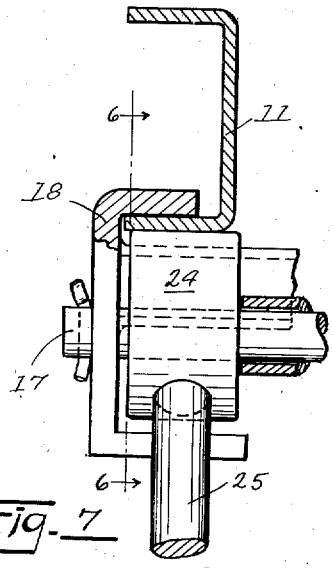
Figure 7 is a sectional view on line VII—VII of Figure 6.

The channel bar housings 18 are each further secured together by means of a tubular member 16 disposed therebetween and an eccentric or cam collar 24 having a handle 25, secured thereto, rotatably embraces each outer end of the tubular member 17. When each handle is turned from its position shown in dotted lines in Figure 6 to its position shown in full lines in the same figure, its cam or eccentric engages the under side of a rail 10, 11 to adjustably maintain the conveyer in selected inclined position.

Each cam or eccentric 24 is provided with a ball well 26 on its outer surface and each channel housing 18 is provided with a ball 28, operable by means of a helical expansion spring 29, within a well 30 whereby the cam or eccentric is maintained in unlocked position.

In operation, the upper or left end of the conveyer, as viewed in Figure 1, is placed upon the elevated delivering dock or station, not shown, and a selected inclination of the conveyer is then adjustably fixed by rotating the cams or eccentrics 24 by means of the handles 25 as hereinbefore explained.

It will thus be seen that the inclination of the conveyer herein illustrated may be adjustably varied and, while but one specific embodiment of the invention has been herein shown and described, it will be understood that certain details of the construction shown may be altered or omitted without departing from the spirit of the invention as the same is defined by the following claims.

We claim:

1. A gravity conveyer having a pair of rails spacedly secured together and means for selectively adjustably varying the inclination of the spaced rails comprising; a pair of members each longitudinally slidable on a rail and secured together by a shaft rotatably disposed therebetween, supporting means for the conveyer secured at one end to the shaft, a second shaft rotatably secured between the rails in spaced relation to the first shaft, a connecting link secured between the second shaft and said supporting means, and an eccentric collar rotatably carried adjacent each opposite end of the first shaft whose cammed surface is adapted to be manually rotated into engagement with its proximate rail.

2. A conveyer having a pair of rails spacedly secured together, and means for selectively adjustably varying the height of the spaced rails, comprising: a pair of members each longitudinally slidable on a rail and secured together by a shaft; supporting means for the conveyer secured to said shaft in pivotal relationship to said pair of members; a second shaft secured between the rails in spaced relation to the first shaft; a connecting link secured between said second shaft in pivotal relationship to said pair of rails and said supporting means in pivotal relationship thereto; cam means rotatably carried adjacent an end of the first shaft and manually rotatable into engagement with the proximate rail.

3. A conveyer having a pair of rails spacedly secured together and means for selectively adjustably varying the height of the spaced rails comprising: a pair of members each longitudinally slidable on a rail and secured together by a shaft; supporting means for the conveyer secured to said shaft in pivotal relationship to said pair of members; a link member pivotally secured at one of its ends to the rails and at the other of its ends pivotally secured to said supporting means; cam means rotatably carried adjacent an end of said shaft and manually rotatable into engagement with one of said rails.

BERT WOLDRING.
JAMES R. SEBASTIAN.

REFERENCES CITED

The following references are of record in the file of this patent:

UNITED STATES PATENTS

| Number | Name | Date |
|---|---|---|
| 747,952 | Dillon | Dec. 29, 1903 |
| 1,471,763 | Wentz | Oct. 23, 1923 |
| 1,812,119 | Ruse | June 30, 1931 |
| 2,199,097 | Chappelle | Apr. 30, 1940 |

FOREIGN PATENTS

| Number | Country | Date |
|---|---|---|
| 296,912 | Germany | Mar. 9, 1917 |